(12) United States Patent
Cho

(10) Patent No.: US 10,182,473 B2
(45) Date of Patent: Jan. 15, 2019

(54) POWER CONVERTER AND COOKING APPARATUS INCLUDING THE SAME

(71) Applicant: LG ELECTRONICS INC., Seoul (KR)

(72) Inventor: Seungkeun Cho, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 376 days.

(21) Appl. No.: 15/006,641

(22) Filed: Jan. 26, 2016

(65) Prior Publication Data

US 2016/0219654 A1 Jul. 28, 2016

(30) Foreign Application Priority Data

Jan. 27, 2015 (KR) .................. 10-2015-0012984

(51) Int. Cl.
*H05B 6/68* (2006.01)
*H05B 6/66* (2006.01)
*H02M 7/5387* (2007.01)

(52) U.S. Cl.
CPC ........ *H05B 6/687* (2013.01); *H02M 7/53871* (2013.01); *H05B 6/682* (2013.01); *H05B 6/683* (2013.01); *Y02B 40/143* (2013.01); *Y02B 70/1441* (2013.01)

(58) Field of Classification Search
CPC .......... H05B 6/66; H05B 6/682; H05B 6/683; H05B 6/685; H05B 6/687; H05B 2206/04; H02M 7/53871; H02M 1/36; Y02B 40/143

USPC ................ 219/710, 715, 716, 718, 719, 721
See application file for complete search history.

(56) References Cited

U.S. PATENT DOCUMENTS 6,215,112 B1 *  4/2001  Kim .................... H05B 6/6447
                                                       219/704
2008/0047959 A1 *  2/2008  Moriya ................. H05B 6/685
                                                       219/745

FOREIGN PATENT DOCUMENTS

| JP | 63-281391 A | | 11/1988 |
|---|---|---|---|
| JP | 4-181687 A | * | 6/1992 |
| JP | 04-181687 A | | 6/1992 |
| JP | 2006-114419 A | | 4/2006 |

* cited by examiner

*Primary Examiner* — Hung D Nguyen
(74) *Attorney, Agent, or Firm* — Dentons US LLP

(57) ABSTRACT

A power converter and a cooking apparatus including the same are disclosed. The power converter includes a switching unit to perform switching using a direct current (DC) voltage and to output an alternating current (AC) voltage, a driving unit to output a high-frequency voltage to a magnetron based on the AC voltage, an output voltage detector to detect an output voltage flowing to the magnetron, and a controller to calculate a frequency command value based on the detected output voltage, to generate a frequency command value by avoiding a resonance frequency when the calculated frequency command value corresponds to the resonance frequency, and to output the generated frequency command value to the switching unit. Therefore, it is possible to stably perform oscillation.

16 Claims, 9 Drawing Sheets

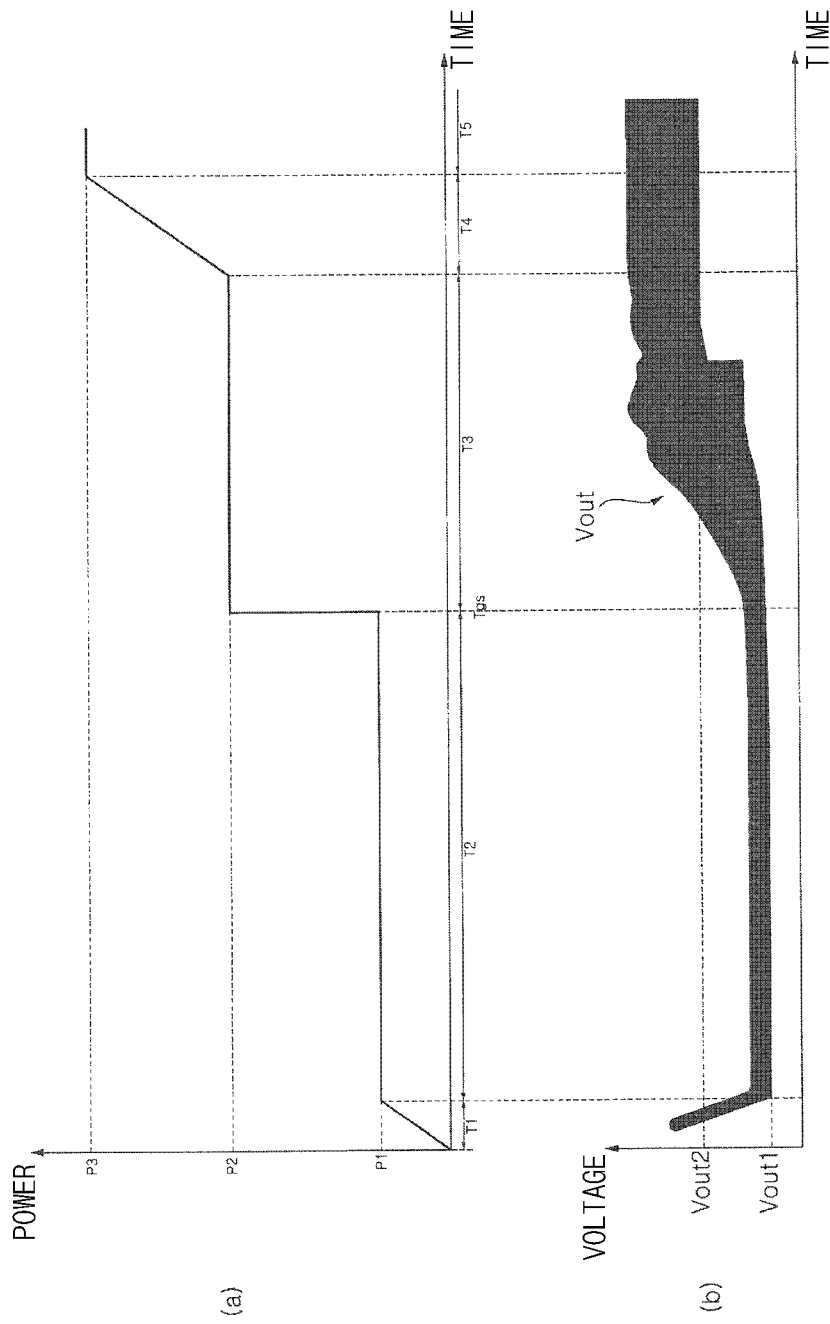

POWER CONVERTER AND COOKING APPARATUS INCLUDING THE SAME

CROSS-REFERENCE TO RELATED APPLICATION

This application claims the priority benefit of Korean Patent Application No. 10-2015-0012984, filed on, 27 Jan. 2015, in the Korean Intellectual Property Office, the disclosure of which is incorporated herein by reference.

BACKGROUND OF THE INVENTION

1. Field of the Invention

The present invention relates to a power converter and a cooking apparatus including the same, and, more particularly, to a power converter capable of stably performing oscillation and a cooking apparatus including the same.

2. Description of the Related Art

In general, when an operation button is pressed after putting food into a cooking apparatus using microwaves and closing the cooking apparatus, a voltage is applied to a high-voltage generator and the voltage applied to the high-voltage generator is boosted to apply a voltage to a magnetron for generating microwaves and the microwaves generated by the magnetron are delivered to a cavity via a waveguide.

At this time, the cooking apparatus using microwaves heats the food using frictional heat generated by irradiating microwaves generated by the magnetron to the food to vibrate molecules constituting the food 2.45 billion times per second.

In order to drive the magnetron, high-frequency oscillation should be performed using an AC input voltage. Various attempts to stably drive the cooking apparatus have been made.

SUMMARY OF THE INVENTION

Therefore, the present invention has been made in view of the above problems, and it is an object of the present invention to provide a power converter capable of stably performing oscillation and a cooking apparatus including the same.

An object of the present invention is to provide a power converter including a switching unit to perform switching using a direct current (DC) voltage and to output an alternating current (AC) voltage, a driving unit to output a high-frequency voltage to a magnetron based on the AC voltage, an output voltage detector to detect an output voltage flowing to the magnetron, and a controller to calculate a frequency command value based on the detected output voltage, to generate a frequency command value by avoiding a resonance frequency when the calculated frequency command value corresponds to the resonance frequency, and to output the generated frequency command value to the switching unit.

Another object of the present invention is to provide a power converter including a switching unit to perform switching using a direct current (DC) voltage and to output an alternating current (AC) voltage, a driving unit to output a high-frequency voltage to a magnetron based on the AC voltage, an output voltage detector to detect an output voltage flowing to the magnetron, and a controller to control a frequency command value to be constant during at least a portion of a pre-oscillation period in order to heat the magnetron, to control the frequency command value to pulsate during an oscillation stabilization period of an oscillation period, to calculate the frequency command value based on the detected output voltage, to generate a frequency command value by avoiding a resonance frequency when the calculated frequency command value corresponds to the resonance frequency, and to output the generated frequency command value to the switching unit, during the pre-oscillation period or the oscillation stabilization period.

Another object of the present invention is to provide a cooking apparatus including a microwave generator to generate microwaves for heating an object in a cavity, a power converter to supply converted power to the microwave generator, and a microwave transmitter to transmit the generated microwaves to the inside of the cavity, wherein the power converter includes a switching unit to perform switching using a direct current (DC) voltage and to output an alternating current (AC) voltage, a driving unit to output a high-frequency voltage to a magnetron based on the AC voltage, an output voltage detector to detect an output voltage flowing to the magnetron, and a controller to calculate a frequency command value based on the detected output voltage, to generate a frequency command value by avoiding a resonance frequency when the calculated frequency command value corresponds to the resonance frequency, and to output the generated frequency command value to the switching unit.

According to one embodiment of the present invention, a power converter and a cooking apparatus including the same include a switching unit to perform switching using a direct current (DC) voltage and to output an alternating current (AC) voltage, a driving unit to output a high-frequency voltage to a magnetron based on the AC voltage, an output voltage detector to detect an output voltage flowing to the magnetron, and a controller to calculate a frequency command value based on the detected output voltage, to generate a frequency command value by avoiding a resonance frequency when the calculated frequency command value corresponds to the resonance frequency, and to output the generated frequency command value to the switching unit.

In particular, since the magnetron can be driven while avoiding the resonance frequency, it is possible to prevent a circuit element from being damaged by a surge voltage.

The controller changes the frequency command value before oscillation to heat the filament of the magnetron.

During the heating period, when the level of the frequency command value reaches the first level after the first time by change of the frequency command value, the controller controls the frequency command value to become an oscillation frequency. Therefore, it is possible to shorten an oscillation time.

BRIEF DESCRIPTION OF THE DRAWINGS

The above and other objects, features and other advantages of the present invention will be more clearly understood from the following detailed description taken in conjunction with the accompanying drawings, in which:

FIG. 6 is a view referred to for describing operation of the controller of FIG. 5;

DETAILED DESCRIPTION OF THE PREFERRED EMBODIMENTS

Exemplary embodiments of the present invention will be described below in detail with reference to the accompanying drawings.

The terms "module" and "unit" attached to describe the names of components are used herein to aid in the understanding of the components and thus should not be considered as having specific meanings or roles. Accordingly, the terms "module" and "unit" may be used interchangeably.

Figure 1:
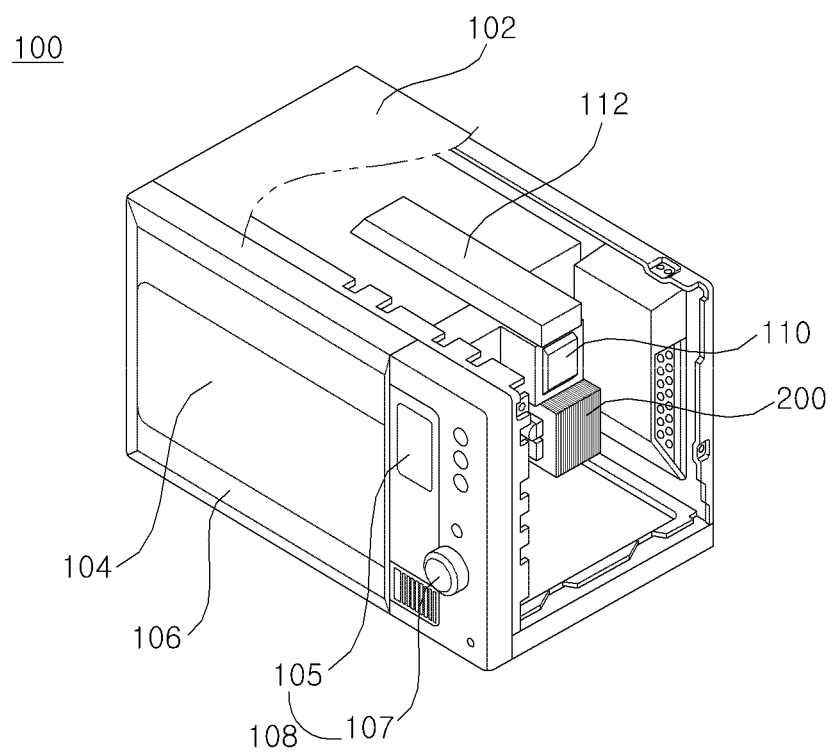
FIG. 1 is a partial perspective view of a cooking apparatus according to an embodiment of the present invention.
Figure 2:
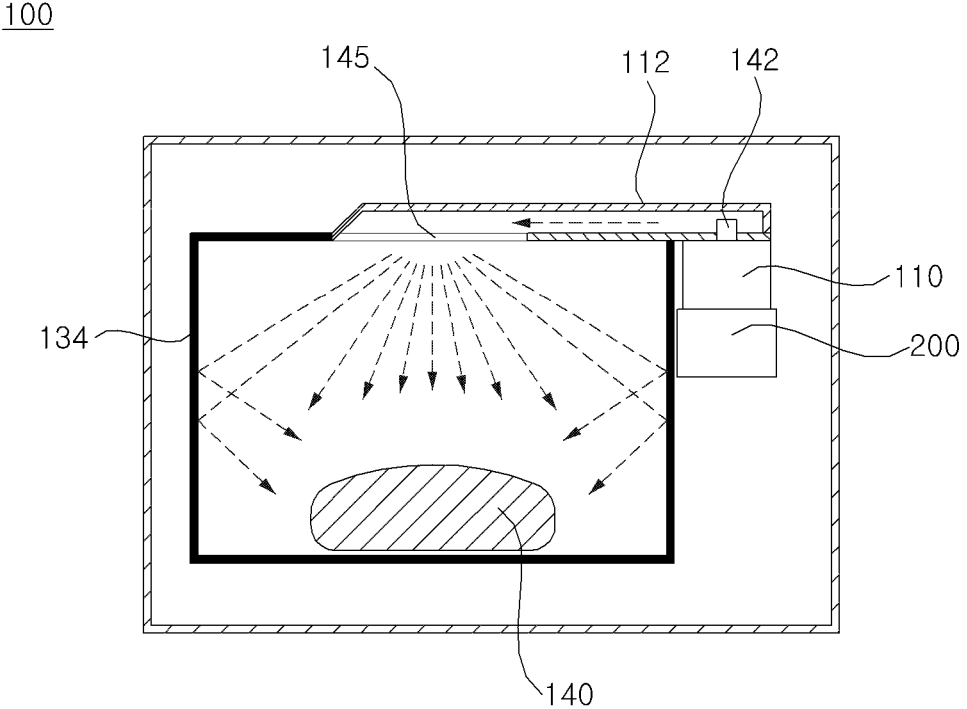
FIG. 2 is a cross-sectional view of the cooking apparatus of FIG. 1.

FIG. 1 is a partial perspective view of a cooking apparatus according to an embodiment of the present invention, and FIG. 2 is a cross-sectional view of the cooking apparatus of FIG. 1.

Referring to the figure, in the cooking apparatus 100 according to the embodiment of the present invention, a door 106 having a cooking window 104 attached thereto is openably and closably coupled to a front surface of a main body 102 and an operation panel 108 is coupled to a portion of the front surface of the main body 102.

The door 106 opens and closes a cavity 134. Although not shown, a door choke (not shown) for shielding microwaves may be placed in the door 106.

The operation panel 108 includes an operation unit 107 for operating the cooking apparatus and a display unit 105 for displaying operation of the cooking apparatus.

The cavity 134 having a space having a predetermined size is provided in the main body 102 such that an object to be heated 140, for example, food is held and heated by microwaves.

A microwave generator 110 for generating microwaves is provided on an outer side surface of the cavity 134 and a microwave transmitter 112 for guiding the microwaves generated by the microwave generator 110 into the cavity 134 is provided on the output side of the microwave generator 110.

The microwave generator 110 may include a magnetron. The magnetron may generate and output a high frequency of 2450 MHz.

The microwave transmitter 112 transmits the microwaves generated and output by the microwave generator 110 to the cavity 134. The microwave transmitter 112 may include a waveguide or a coaxial line. In order to transmit the generated microwaves to the microwave transmitter 112, as shown in the figure, a feeder 142 may be connected.

Although the microwave transmitter 112 may have an opening 145 leading to the cavity 134 as shown in the figure, the present invention is not limited thereto and an antenna may be connected to an end of the microwave transmitter. The opening 145 may have various shapes such as a slot shape. Through the opening 145 or the antenna, the microwaves are radiated to the cavity 134.

Although one opening 145 is provided at the upper side of the cavity 134 in the figure, the opening 145 may be provided at the lower side or the lateral side of the cavity 134 or a plurality of openings may be provided. The same is true when the antenna is provided instead of the opening 145.

The power conversion unit for supplying a voltage to the microwave generator 110 is provided below the microwave generator 110.

The power conversion unit may boost the voltage input to the cooking apparatus 100 to a high voltage and supply the high voltage to the microwave generator 110. The power conversion unit may include a high-voltage transformer or an inverter for supplying a high voltage of about 3500 V generated by switching operation of one or more switching elements to the microwave generator 110.

A cooling fan (not shown) for cooling the microwave generator 110 may be provided around the microwave generator 110.

Although not shown, a resonance mode converter (not shown) for converting a resonance mode of the cavity 134 may be provided. An example of the resonance mode converter (not shown) may be at least one of a stirrer, a rotation table or a sliding table. The rotation table or the sliding table may be provided at the upper side of the cavity 134 and the stirrer may be provided at various positions of the cavity, that is, the lower side, the lateral side or the upper side of the cavity.

The cooking apparatus 100 using the microwaves operates when a user opens the door 106, puts the object to be heated 140 in the cavity 134 and presses a cooking selection button (not shown) and a start button (not shown) of the operation panel 108, more particularly, the operation unit 107, with the door 106 closed.

That is, the power conversion unit of the cooking apparatus 100 boosts the input AC voltage to a high DC voltage and supplies the high DC voltage to the microwave generator 110, the microwave generator 110 generates and outputs microwaves, and the microwave transmitter 112 transmits and radiates the generated microwaves to the cavity 134. Therefore, the object to be heated 140 held in the cavity 134, for example, food, is heated.

The power conversion unit of FIG. 1 is hereinafter referred to as a power converter.

Figure 3:
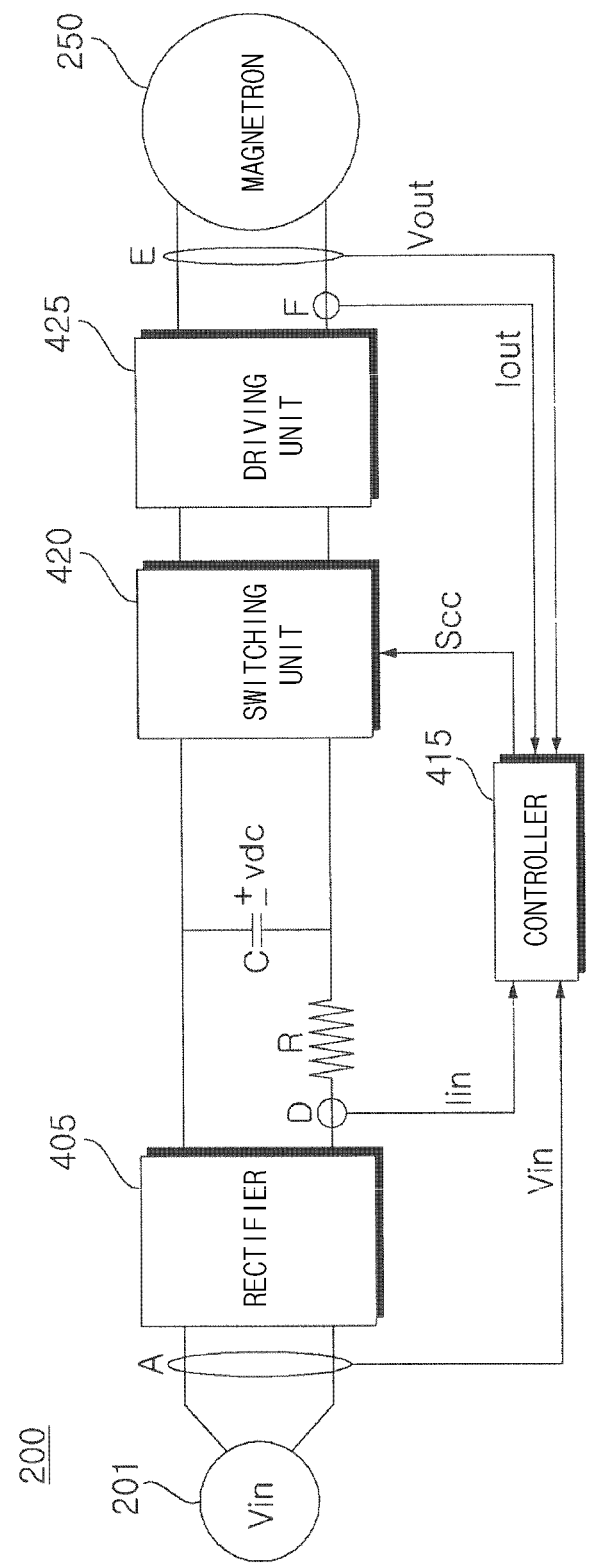
FIG. 3 is a block diagram showing an example of a power converter according to an embodiment of the present invention.

FIG. 3 is a block diagram showing an example of a power converter according to an embodiment of the present invention.

Referring to the figure, the power converter 200 according to one embodiment of the present invention may convert an input AC voltage. In particular, the power converter 200 may convert the input AC voltage into a DC voltage, boost the DC voltage and output a high voltage.

The power converter 200 may include a rectifier 405, a dc end capacitor C, a switching unit 420, a driving unit 425 and a controller 415.

The rectifier 405 rectifies an input AC voltage Vin 201 and outputs the rectified voltage. The rectifier 405 may include a diode. More specifically, a bridge diode may be included.

The rectified voltage is stored in the dc end capacitor C and may be smoothed.

Unlike the figure, a converter including a switching element may be used instead of the rectifier.

An input voltage detector A may detect the input voltage Vin input to the rectifier 405. The input voltage detector A may include a resistor, an amplifier or a voltage transformer. The detected input voltage Vin may be input to the controller 415.

An input current detector D may detect input current Iin. Although input current Iin flowing between the rectifier 405 and the dc end is shown as being detected in the figure, input current Iin flowing in a previous stage of the rectifier 405 may be detected.

Although not shown in the figure, a dc end voltage detector (not shown) may be further included. The dc end voltage detector (not shown) may detect a voltage Vdc across the dc end. The dc end voltage detector (not shown) may include a resistor, an amplifier or a voltage transformer. The detected voltage Vdc across the dc end may be input to the controller 415.

The switching unit 420 includes a plurality of switching elements and may perform switching operation using a dc voltage to output an AC voltage.

In particular, the switching unit 420 may perform switching operation using the DC voltage Vdc across the dc end capacitor C to output an AC voltage.

The switching unit 420 may include an upper-arm switching element Sa and a lower-arm switching element S'a. At this time, the upper-arm switching element Sa and the lower-arm switching element S'a may complimentarily operate.

A pulse signal Scc from the controller 415 may be input to the upper-arm switching element Sa and the lower-arm switching element S'a. At this time, the pulse signal Scc may be generated based on a frequency command value Fref generated by the controller 415.

The driving unit 425 may output a high-frequency voltage to the magnetron 250 using the AC voltage output by the switching operation of the switching unit 420.

The magnetron 250 may be a diode vacuum tube for oscillating microwaves in a magnetic field. The magnetron 250 may include an anode, a cathode and a grid. A filament (FM of FIG. 4) may be connected to the cathode in order to heat the magnetron 250.

An output voltage detector E may detect an output voltage Vout across the magnetron 250. That is, the output voltage Vout supplied to the magnetron 250 may be detected. The output voltage detector E may include a resistor, an amplifier or a voltage transformer. The detected output voltage Vout may be input to the controller 415.

The output current detector F may detect output current Iout flowing in the magnetron 250. In the figure, output current Iout flowing in the output end of the magnetron 250 is detected.

The controller 415 may calculate the frequency command value Fref based on the detected output voltage Vout and output a generated frequency command value Fref while avoiding a resonance frequency when the changed frequency command value Fref corresponds to the resonance frequency.

The controller 415 may calculate consumed power P of the magnetron 250 based on the detected output voltage Vout.

The controller 415 may calculate the consumed power of the magnetron 250 based on the detected output voltage Vout and output current Iout.

The controller 415 may generate a current command value Iref based on the calculated output power P and generate a frequency command value Fref based on the current command value Iref.

The controller 415 may control the calculated output power P to follow a power command value pref.

The controller 415 may control the detected input current Iin to follow the current command value Iref generated by a current command generator 411.

The controller 415 may calculate output power P based on the detected output current Iout and output voltage Vout during a filament heating period of the magnetron 250 before oscillation of the magnetron 250, change the frequency command value Fref based on the calculated output power P, and output the generated frequency command value Fref while avoiding the resonance frequency when the changed frequency command value Fref corresponds to the resonance frequency.

When the level of the frequency command value Fref reaches a first level within a first time by change of the frequency command value Fref, the controller 415 may control the level of the frequency command value Fref to become a second level greater than the first level.

When the level of the frequency command value Fref reaches the first level after the first time by change of the frequency command value Fref, the controller 415 may control the frequency command value Fref to become an oscillation frequency.

The controller 415 may generate a pulsating frequency command value Fref based on the detected input current and current command value Iref, in order to increase the output voltage Vout applied to the magnetron 250, and the switching unit 420 may perform switching operation based on a pulse signal corresponding to the pulsating frequency command value Fref.

Operation of the controller 415 will be described below in detail with reference to FIGS. 4 to 5.

Figure 4:
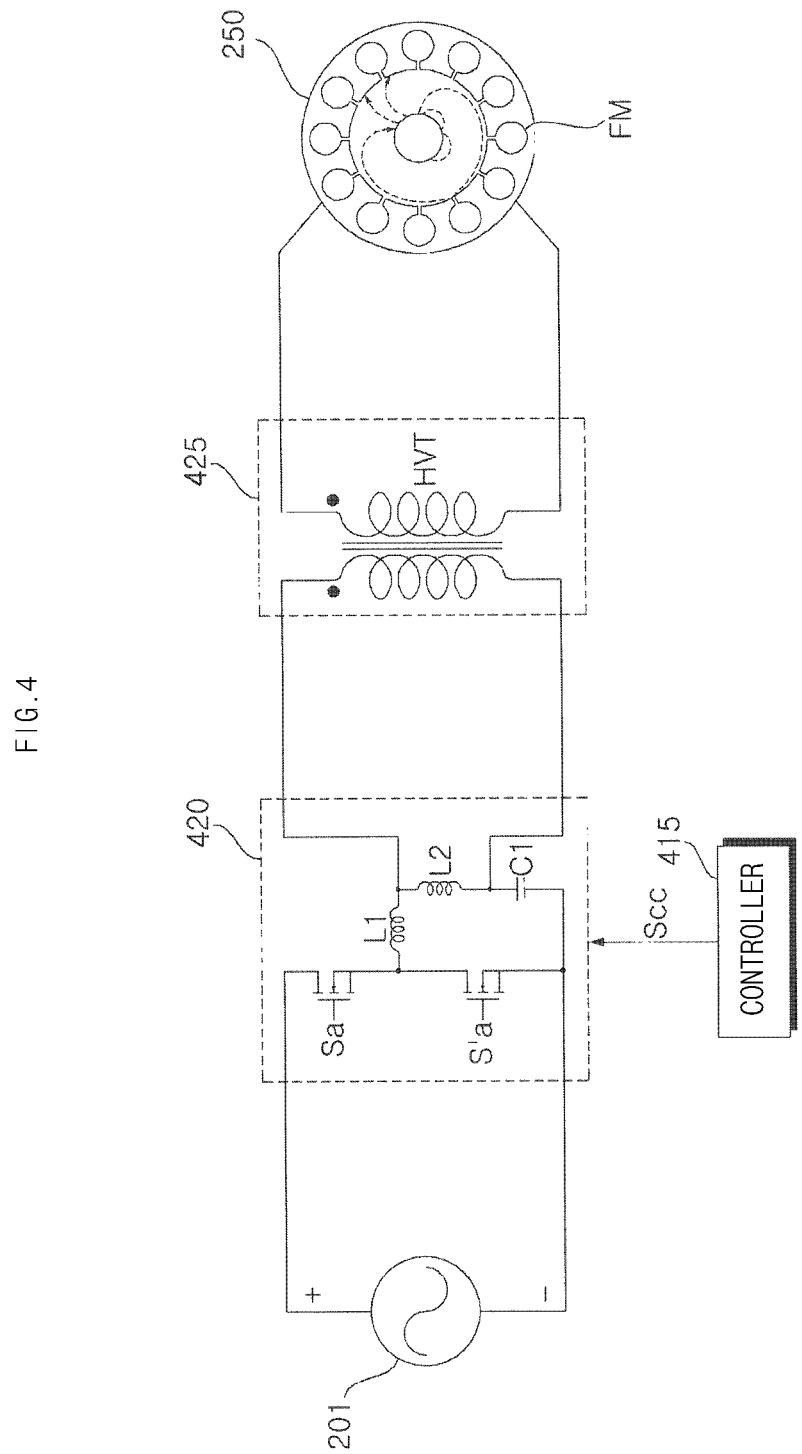
FIG. 4 is a circuit diagram showing an example of the power converter according to the embodiment of the present invention.

FIG. 4 is a circuit diagram showing an example of the power converter according to the embodiment of the present invention.

Referring to the figure, the circuit diagram of the power converter 200 of FIG. 4 is similar to that of FIG. 3, except that the switching unit 420 and the driving unit 425 of FIG. 3 are shown in greater detail.

Therefore, the switching unit 420 and the driving unit 425 will be focused upon.

The switching unit 420 may include the upper-arm and lower-arm switching elements Sa and S'a and an LLC filter. The driving unit 425 may include a transformer. In particular, the driving unit 425 may include a high-voltage transformer (HVT).

More specifically, the upper-arm and lower-arm switching elements Sa and S'a are connected in series across the dc end. A first inductor L1, a second inductor L2 and a capacitor C1 may be connected to the lower-arm switching element S'a in parallel.

One end of the first inductor L1 may be connected between the upper-arm and lower-arm switching elements Sa and S'a, a primary input of the transformer HVT may be connected between the other end of the first inductor L1 and one end of the second inductor L2, and a primary output of the transformer HVT may be connected between the other end of the second inductor L2 and the capacitor C1.

The magnetron 250 may be connected across the secondary side of the transformer HVT.

When the magnetron 250 is driven using the power converter 200, the frequency command value needs to be changed in order to heat the magnetron.

The switching unit 420 includes an L (inductor) component and a C (capacitor) component, by which the resonance frequency is determined.

When the resonance frequency is reached upon changing the frequency command value, a surge high voltage is applied to the magnetron 250 by resonance. For example, the surge high voltage of about 8 kV is instantaneously applied.

To this end, a probability that not only the magnetron 250 but also the various circuit elements of the power converter 200 are damaged increases.

In the present invention, the controller 415 may calculate the frequency command value based on the detected output voltage and outputs the generated frequency command value while avoiding the resonance frequency when the calculated frequency command value corresponds to the resonance frequency, thereby stably performing oscillation. In particular, the magnetron 250 may be driven while avoiding the resonance frequency, thereby preventing the circuit elements from being damaged by the surge voltage.

Operation of the power converter 200 according to the embodiment of the present invention will be described in greater detail with reference to FIG. 5.

Figure 5:
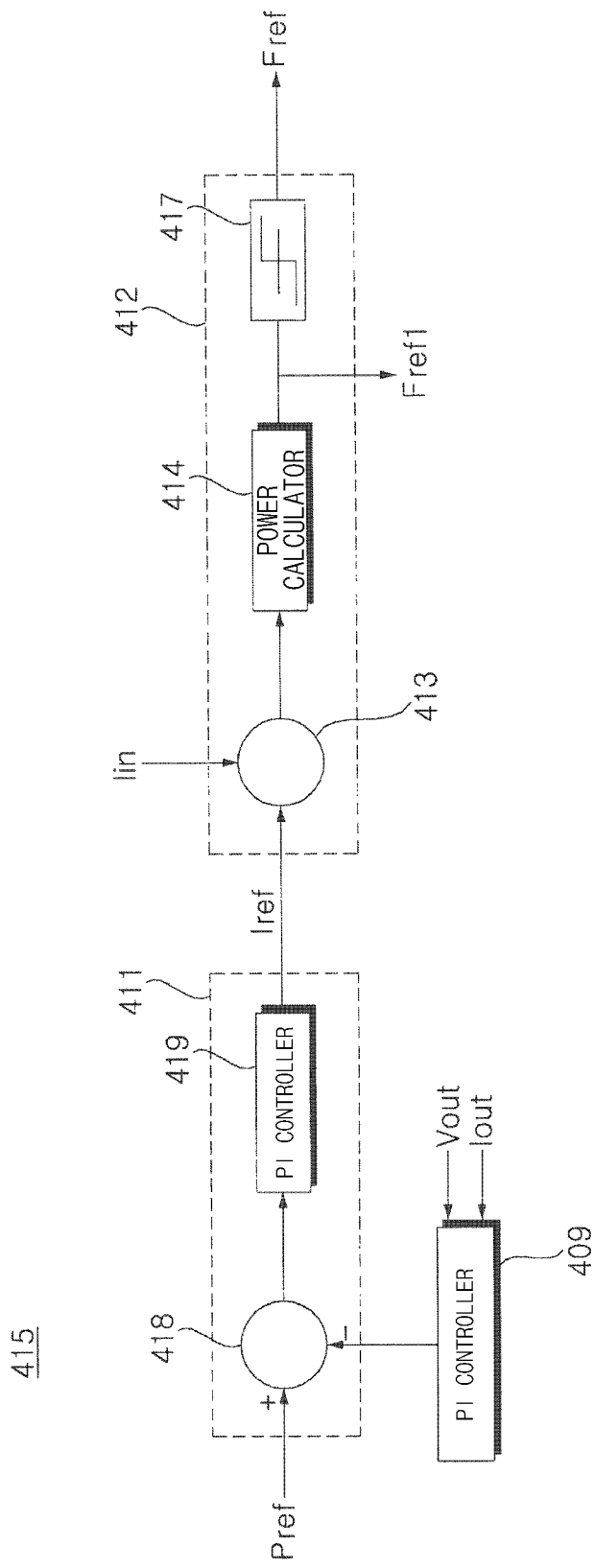
FIG. 5 is a block diagram showing an example of a controller of FIG. 3 or 4.

FIG. 5 is a block diagram showing an example of the controller of FIG. 3 or 4.

Referring to the figure, the controller 415 may include a power calculator 409, a current command value generator 411 and a frequency command value generator 412.

The power calculator 409 may calculate output power P based on the output voltage Vout. In particular, the output power P may be calculated based on the output voltage Vout and the output current Iout.

The current command value generator 411 may generate the current command value Iref based on the calculated output power P. In particular, the current command value generator 411 may generate the current command value Iref based on the calculated output power P and the power command value Pref.

The current command value generator 411 may include a calculator 419 for calculating a difference between the power command value Pref and the calculated output power P and a proportional integral (PI) controller 419 for controlling the calculated output power P to follow the power command value Pref based on such difference.

For example, as the difference between the power command value Pref and the calculated output power P increases, the level of the current command value Iref may increase. As the difference between the power command value Pref and the calculated output power P decreases, the level of the current command value Iref may decrease.

As a result, the current command value generator 411 may generate and output the current command value Iref.

Next, the frequency command value generator 412 may generate the frequency command value Fref based on the input current Iin detected by the input current detector D and the current command value Iref generated by the current command value generator 411. The controller 415 may output the pulse signal Scc based on the frequency command value Fref to the switching unit 420.

The frequency command value generator 412 may include a calculator 413 for calculating a difference between the current command value Iref and the detected input current Iin and a proportional integral (PI) controller 414 for controlling the detected input current Iin to follow the current command value Iref based on such difference. The frequency command value generator 412 may output the frequency command value Fref.

For example, as the difference between the current command value Iref and the detected input current Iin increases, the level of the frequency command value Fref may increase. As the difference between the current command value Iref and the detected input current Iin decreases, the level of the frequency command value Fref may decrease.

The frequency command value generator 412 may further include a limiter 417 for limiting the resonance frequency when the generated frequency command value Fref is the resonance frequency.

Accordingly, the frequency command value generator 42 calculates the frequency command value Fref and outputs the generated frequency command value Fref while avoiding the resonance frequency when the calculated frequency command value Fref is the resonance frequency.

The controller 415 may calculate the output power P based on the detected output current Iout and output voltage Vout during the filament heating period of the magnetron 250 before oscillation of the magnetron 250, change the frequency command value Fref based on the calculated output power P, and output the generated frequency command value Fref while avoiding the resonance frequency when the changed frequency command value Fref corresponds to the resonance frequency.

When the level of the frequency command value Fref reaches a first level within a first time by change of the frequency command value Fref, the controller 415 may control the level of the frequency command value Fref to become a second level greater than the first level.

When the level of the frequency command value Fref reaches the first level after the first time by change of the frequency command value Fref, the controller 415 may control the frequency command value Fref to become an oscillation frequency.

The controller 415 may generate a pulsating frequency command value Fref based on the detected input current and current command value Iref, in order to increase the output voltage Vout applied to the magnetron 250, and the switching unit 420 may perform switching operation based on a pulse signal corresponding to the pulsating frequency command value Fref.

FIG. 6 is a view referred to for describing operation of the controller of FIG. 5.

The controller 415 may control the switching unit 420 to sequentially increase the power applied to the magnetron 250.

Referring to the figure, the period may be divided into a first period T1 for soft-switching the switching unit 420, a heating period for heating the magnetron 250, an oscillation stabilization period T3, an output acceleration period T4 and a normal operation period T5. The first and second periods correspond to a pre-oscillation period and the third to fifth periods correspond to a post-oscillation period.

During the first period T1, the output power applied to the magnetron 250 sequentially increases up to P1. The soft starting unit 416 in the frequency command value generator 412 may sequentially increase the frequency command value.

During the second period T2, the output power applied to the magnetron 250 may be maintained at P1. The frequency command value generator 412 may output a constant frequency command value. Alternatively, the frequency command value generator 412 may output the pulsating frequency command value.

The consumed power P2 applied to the magnetron 250 may increase to P2 such that oscillation is performed at a time Tgs.

During the third period T3, the output power applied to the magnetron 250 may be maintained at P2. The frequency command value generator 412 may output a pulsating frequency command value based on pulse frequency modulation (PFM).

During the fourth period T4, the output power applied to the magnetron 250 sequentially increases up to P3. The frequency command value generator 412 may sequentially increase the frequency command value.

During the fifth period T5, the output power applied to the magnetron 250 may be maintained at P3.

(b) of FIG. 6 shows the output voltage Vout applied to the magnetron, which has a first voltage level Vout1 in the second period T2 and has a second voltage level Vout2 or more in the third period T3.

Figure 7A:
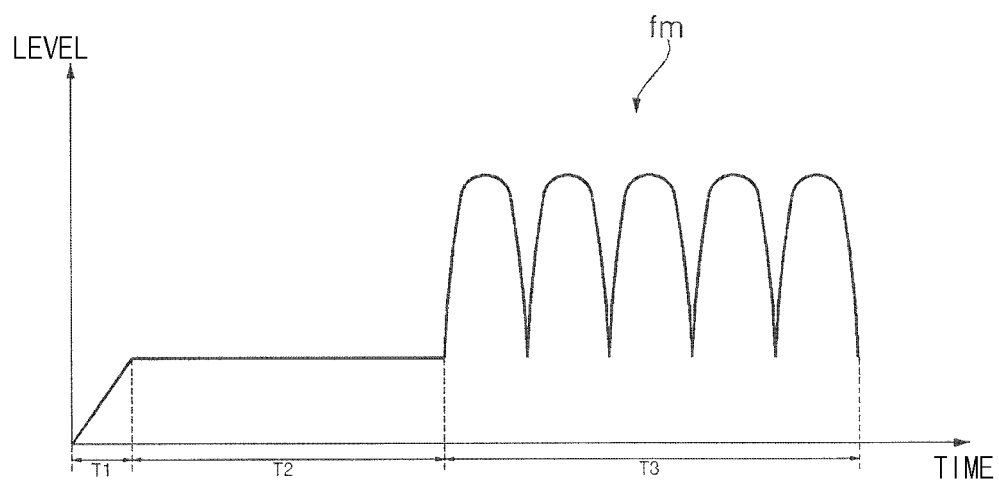
FIGS. 7A to 8 are views referred to for describing operation of the power converter of FIG. 3 or 4.
Figure 7B:
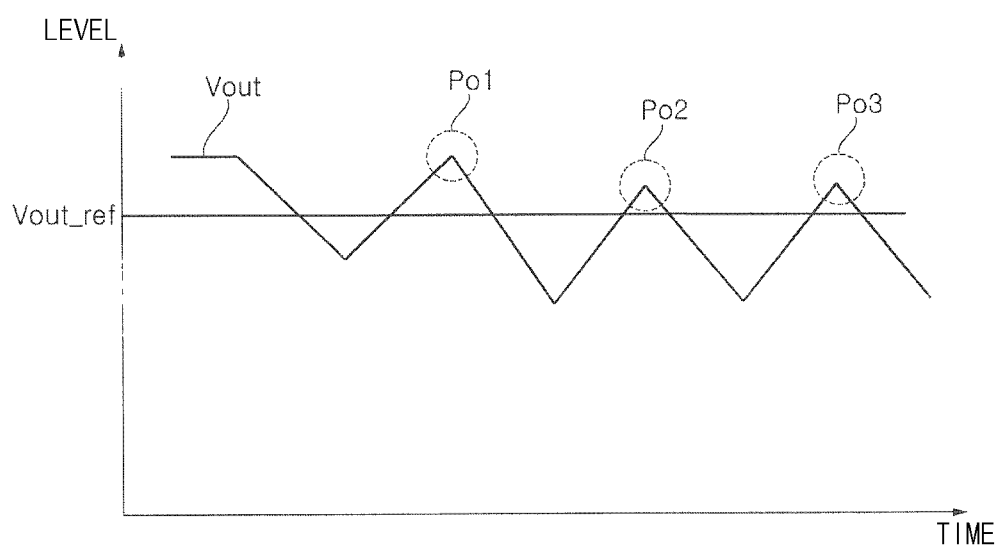
Figure 8:
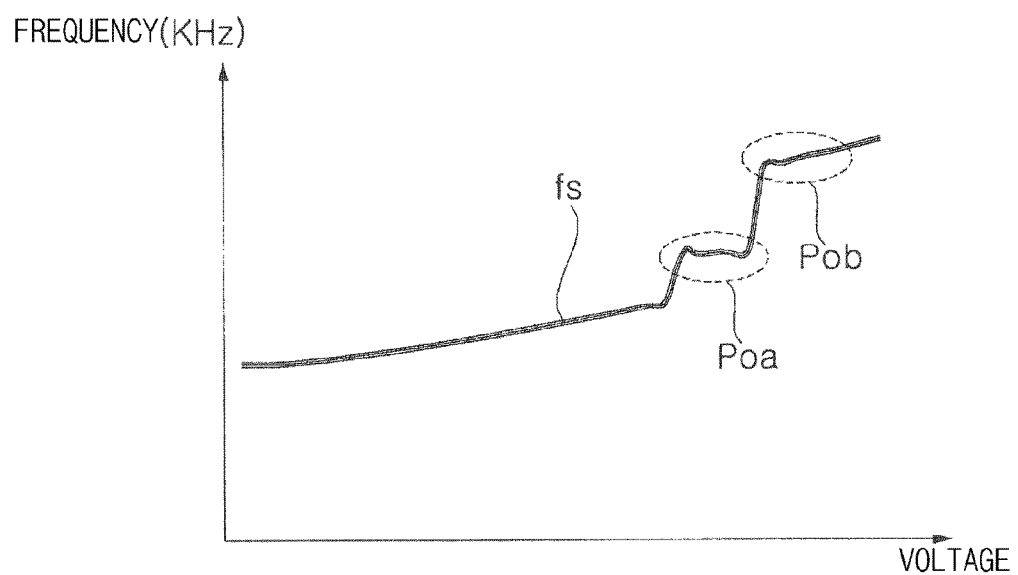

FIGS. 7A to 8 are views referred to for describing operation of the power converter of FIG. 3 or 4.

First, FIG. 7A shows an example of a frequency command value Fm generated by the frequency command value generator 412 of the controller 415. In particular, the frequency command value Fm during the first period T1 to the third period T3 is shown.

The frequency command value Fm shown in the figure may correspond to the frequency command value Fref of FIG. 5.

The controller 415 may increase the frequency command value such that soft starting is performed during the first period T1 which is the pre-oscillation period.

The controller 415 may control the frequency command value to be constant during the second period T2 which is the pre-oscillation period, in order to heat the magnetron. Unlike the figure, the frequency command value may increase.

The controller 415 may control the frequency command value to pulsate during the oscillation stabilization period T3 which is the oscillation period.

The controller 415 may control the generated frequency command value Fref while avoiding the resonance frequency when the calculated frequency command value Fref corresponds to the resonance frequency, during the second period T2 or the oscillation stabilization period T3.

FIG. 7B shows an example of the output voltage Vout applied across the magnetron.

Although the command value Vout_ref of the output voltage Vout has a constant value, the output voltage Vout is not constant during actual operation.

In particular, during the second period T2 or the oscillation stabilization period T3, the output voltage Vout is not constant.

During the second period T2 or the oscillation stabilization period T3, when the generated frequency command value Vref corresponds to the resonance frequency, as shown in the figure, a surge voltage is generated at a first point Po1, a second point Po2 and a third point Po3.

In order to prevent the surge voltage, as described above, the controller 415 may output the generated frequency command value Fref while avoiding the resonance frequency when the calculated frequency command value Fref corresponds to the resonance frequency.

In particular, the frequency command value may be generated while avoiding the frequencies corresponding to the first point Po1, the second point Po2 and the third point Po3.

The frequency command value generator 412 of the controller 415 may include the limiter 417 for limiting the resonance frequency.

FIG. 8 shows the frequency command value S excluding the resonance frequency according to the embodiment of the present invention.

Referring to the figure, in the frequency command value S, a specific frequency is excluded in a first period Poa and a second period Pob.

The frequency command value S of the figure may correspond to the frequency command value Fref of FIG. 5.

Figure 9:
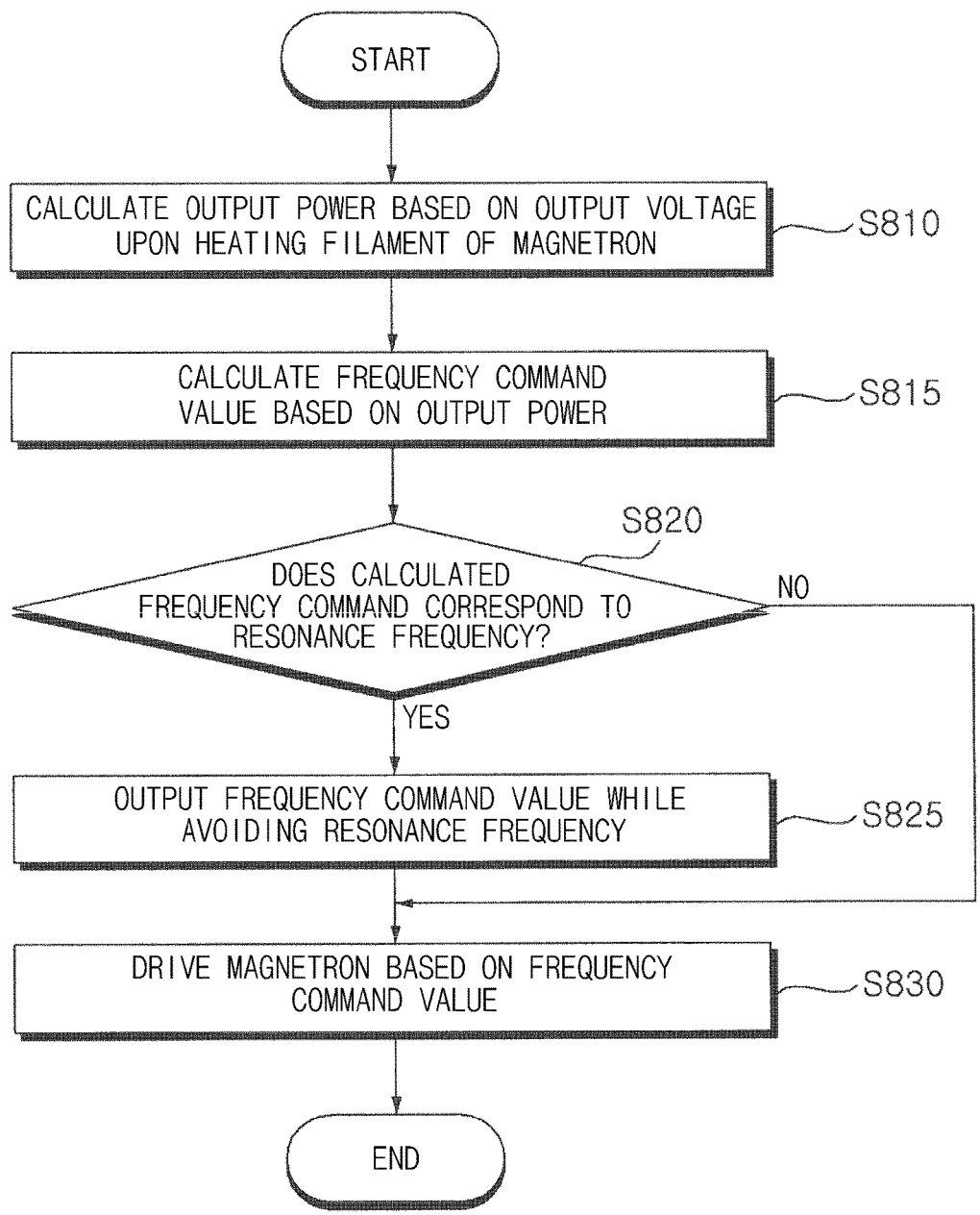
FIG. 9 is a flowchart illustrating a method of operating a power converter according to an embodiment of the present invention.

FIG. 9 is a flowchart illustrating a method of operating a power converter according to an embodiment of the present invention.

Referring to the figure, the controller 415 of the power converter 200 calculates the output power P based on the output voltage Vout upon heating the filament of the magnetron 250 (S810).

Next, the controller 415 of the power converter 200 calculates the frequency command value based on the output power P (S815).

Next, the controller 415 of the power converter 200 determines whether the calculated frequency command corresponds to the resonance frequency according to the circuit configuration (S820). When the calculated frequency command corresponds to the resonance frequency, the controller 415 of the power converter 200 outputs the generated frequency command value Fref while avoiding the resonance frequency (S825).

Next, the controller 415 of the power converter 200 drives the magnetron 250 based on the frequency command value Fref (S830).

As described above, the controller for outputting the generated frequency command value to the switching unit while avoiding the resonance frequency when the calculated frequency command value corresponds to the resonance frequency may be included to stably perform oscillation.

In particular, the magnetron may be driven while avoiding the resonance frequency to prevent the circuit element from being damaged by the surge voltage.

The controller may change the frequency command value before oscillation to heat the filament of the magnetron.

The controller may control the frequency command value to become the oscillation frequency when the level of the frequency command value reaches the first level after the first time by change of the frequency command value, thereby shortening the oscillation time.

The power converter and the cooking apparatus including the same according to the foregoing embodiments are not restricted to the embodiments set forth herein. Therefore, variations and combinations of the exemplary embodiments set forth herein may fall within the scope of the present invention.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:
1. A power converter comprising:
a switching unit to perform a switching operation using a direct current (DC) voltage and to output an alternating current (AC) voltage;
a driving unit to output a high-frequency voltage to a magnetron based on the AC voltage;
an output voltage detector to detect an output voltage flowing to the magnetron; and
a controller to calculate a frequency command value based on the detected output voltage, to generate a frequency command value, and to output the generated frequency command value to the switching unit,
wherein the controller calculates an alternative frequency command value when the calculated frequency command value corresponds to a resonance frequency, and wherein the alternative frequency command value avoids the resonance frequency, wherein the controller comprises:
a power calculator to calculate an output power based on the output voltage;
a current command value generator to generate a current command value based on the calculated output power; and
a frequency command value generator to generate the frequency command value based on the current command value, and
wherein the frequency command value generator comprises a limiter to limit the resonance frequency when the generated frequency command value corresponds to the resonance frequency.

2. The power converter of claim 1, wherein the current command value generator comprises a proportional integral controller to control the calculated output power to follow a power command value.

3. The power converter of claim 1, further comprising an input current detector to detect an input current flowing to or through a rectifier,
wherein the frequency command value generator further includes a proportional integral controller to control the detected input current to follow the current command value generated by the current command value generator.

4. The power converter of claim 1, further comprising an output current detector to detect output current flowing in the magnetron,
wherein the controller calculates an output power based on the detected output current and output voltage during a filament heating period of the magnetron before oscillation of the magnetron, adjusts the frequency command value based on the calculated output power, and outputs the generated frequency command value that excludes the resonance frequency when the changed frequency command value corresponds to the resonance frequency.

5. The power converter of claim 4, wherein, when the level of the frequency command value reaches a first level within a first time by change of the frequency command value, the controller controls the level of the frequency command value to become a second level that is greater than the first level.

6. The power converter of claim 5, wherein, when the level of the frequency command value reaches the first level after the first time by change of the frequency command value, the controller controls the frequency command value to be an oscillation frequency.

7. The power converter of claim 1, wherein:
the controller generates a pulsating frequency command value based on the detected input current and a current command value, in order to increase the output voltage applied to the magnetron, and
the switching unit performs the switching operation based on a pulse signal corresponding to the pulsating frequency command value.

8. The power converter of claim 1, wherein the controller:
controls the frequency command value to increase so as to perform a soft start-up during a first pre-oscillation period,
controls the frequency command value to be constant during a second pre-oscillation period, in order to heat the magnetron,
controls the frequency command value to pulsate during an oscillation stabilization period of an oscillation period, and
controls the generated frequency command value to be output while avoiding the resonance frequency when the calculated frequency command value corresponds to the resonance frequency, during the second pre-oscillation period or the oscillation stabilization period.

9. The power converter of claim 1, wherein the controller:
controls the frequency command value to increase so as to perform a soft start-up during a first pre-oscillation period,
controls the frequency command value to sequentially increase during a second pre-oscillation period, in order to heat the magnetron,
controls the frequency command value to pulsate during an oscillation stabilization period of an oscillation period, and
controls the generated frequency command value to be output while avoiding the resonance frequency when the calculated frequency command value corresponds to the resonance frequency during the second pre-oscillation period or the oscillation stabilization period.

10. A cooking apparatus comprising:
a microwave generator to generate microwaves to heat an object in a cavity of the cooking apparatus;
a power converter to provide converted power to the microwave generator; and
a microwave transmitter to transmit the generated microwaves to the inside of the cavity,
wherein the power converter includes:
a switching unit to perform a switching operation using a direct current (DC) voltage and to output an alternating current (AC) voltage;
a driving unit to output a high-frequency voltage to a magnetron based on the AC voltage;
an output voltage detector to detect an output voltage flowing to the magnetron; and
a controller to calculate a frequency command value based on the detected output voltage, and to output the generated frequency command value to the switching unit,
wherein the controller calculates an alternative frequency command value when the calculated frequency command value corresponds to a resonance frequency, and
wherein the alternative frequency command value avoids the resonance frequency,
wherein the controller comprises:
a power calculator to calculate an output power based on the output voltage;
a current command value generator to generate a current command value based on the calculated output power; and
a frequency command value generator to generate a frequency command value based on the current command value, and
wherein the frequency command value generator comprises a limiter to limit the resonance frequency when the generated frequency command value corresponds to the resonance frequency.

11. The cooking apparatus of claim 10, wherein the current command value generator comprises a proportional integral controller to control the calculated output power to follow a power command value.

12. The cooking apparatus of claim 10, wherein the power converter further includes an input current detector to detect an input current, wherein the frequency command value generator further comprises a proportional integral controller to control the detected input current to follow a current command value generated by the current command value generator.

13. The cooking apparatus of claim 10, wherein:
the controller generates a pulsating frequency command value based on the detected input current and a current command value, in order to increase the output voltage applied to the magnetron, and
the switching unit performs the switching operation based on a pulse signal corresponding to the pulsating frequency command value.

14. The cooking apparatus of claim 10, wherein the controller:
controls the frequency command value to increase so as to perform a soft start-up during a first pre-oscillation period,
controls the frequency command value to be constant during a second pre-oscillation period, in order to heat the magnetron,
controls the frequency command value to pulsate during an oscillation stabilization period of an oscillation period, and
controls the generated frequency command value to be output while avoiding the resonance frequency when the calculated frequency command value corresponds to the resonance frequency, during the second pre-oscillation period or the oscillation stabilization period.

15. A cooking apparatus comprising:
a microwave generator to generate microwaves to heat an object in a cavity of the cooking apparatus;
a power converter to provide converted power to the microwave generator; and
a microwave transmitter to transmit the generated microwaves to the inside of the cavity,
wherein the power converter includes:
a switching unit to perform a switching operation using a direct current (DC) voltage and to output an alternating current (AC) voltage;
a driving unit to output a high-frequency voltage to a magnetron based on the AC voltage;
an output current detector to detect an output current flowing in the magnetron;
an output voltage detector to detect an output voltage flowing to the magnetron; and
a controller to calculate a frequency command value based on the detected output voltage, and to output the generated frequency command value to the switching unit,
wherein the controller calculates an alternative frequency command value when the calculated frequency command value corresponds to a resonance frequency, and
wherein the alternative frequency command value avoids the resonance frequency,
wherein the power converter includes an output current detector to detect an output current flowing in the magnetron,
wherein the controller calculates output power based on the detected output current and output voltage during a filament heating period of the magnetron before oscillation of the magnetron, changes the frequency command value based on the calculated output power, and outputs the generated frequency command value while avoiding the resonance frequency when the changed frequency command value corresponds to the resonance frequency,
wherein, when the level of the frequency command value reaches a first level within a first time by change of the frequency command value, the controller controls the level of the frequency command value to become a second level that is greater than the first level.

16. The cooking apparatus of claim 15, wherein, when the level of the frequency command value reaches the first level after the first time by change of the frequency command value, the controller controls the frequency command value to be an oscillation frequency.

* * * * *